United States Patent
Dach et al.

[11] 3,710,647
[45] Jan. 16, 1973

[54] GEAR SHIFT CONTROL SYSTEM

[75] Inventors: Hansjörg Dach, Friedrichshafen; Günter Gackstetter, Langenargen, both of Germany

[73] Assignee: Zahnradfabrik Friedrichshafen AG, Friedrichshafen, Postfach, Germany

[22] Filed: Aug. 3, 1970

[21] Appl. No.: 60,387

[30] Foreign Application Priority Data

Aug. 5, 1969 Germany.................P 19 39 691.9

[52] U.S. Cl..............................74/731, 74/866
[51] Int. Cl............................F16h 47/00, B60k 21/00
[58] Field of Search...........................74/731, 866

[56] References Cited

UNITED STATES PATENTS

| | | | |
|---|---|---|---|
| 3,448,640 | 6/1969 | Nelson | 74/866 |
| 3,416,393 | 12/1968 | Hattori | 74/731 |
| 2,484,011 | 10/1949 | Brunken et al. | 74/731 |
| 2,499,128 | 2/1950 | Brunken | 74/731 |
| 2,529,129 | 11/1950 | Blair | 74/731 |
| 3,007,351 | 11/1961 | Hilpert | 74/731 X |
| 3,182,778 | 5/1965 | Dröschel | 74/866 X |
| 3,073,179 | 1/1963 | Christenson | 74/731 X |
| 3,324,740 | 6/1967 | Lewis et al. | 74/866 |
| 3,572,168 | 3/1971 | Shirai et al. | 74/752 A X |

Primary Examiner—Leonard H. Gerin
Attorney—Zalkind, Horne & Shuster

[57] ABSTRACT

An electro-mechanical system is utilized to control shifting of gears of the transmission of a vehicle driven by an internal combustion engine. Shifting is responsive to torque input and output of fluid torque converters or fluid couplings, and vehicle speed. The system contemplates the use of speed sensors connected to various power transmitting shafts which develop electric signals having a magnitude of current or voltage fed to a computer programmed in accordance with a predetermined formula whereby output torque of the fluid drive is derived and in subsequent conjunction with an electric signal having voltage or current in magnitude proportional to vehicle speed effects control of valves which actuate the gear shifting mechanisms. The programming of the computer is on the basis of an equation such that comparative input and output speeds of fluid torque converters or couplings, in the form of proportional electrical magnitudes, is processed by the computer to an electrical output signal proportional to output torque of the converter or coupling.

14 Claims, 3 Drawing Figures

INVENTORS
Hansjörg Dach
Günter Gackstetter

GEAR SHIFT CONTROL SYSTEM

In prior art devices automatic transmission control has been effected as a function of speed of the vehicle and engine load. Further, various expedients have been used for generating a fluid pressure to shift gears, such pressures being adapted to engine torque or to the drive train. This pressure is proportional to the throttle valve setting, or a load setting, or intake pressure, or by combining some manifestation of load in terms of pressure with some manifestation of vehicle speed in terms of pressure, for the purpose of developing a pressure which is supposed to be proportional to the engine torque or more strictly the torque rotating the impeller of a torque converter or a fluid coupling. However, such prior art systems, (e.g., U.S. Pat. Nos. 2,788,678 and 2,932,990) taken in any form or combination of components produce only a coarse approximation of the converter or fluid coupling input torque and a mismatch of input power and load requirement results. In the case of diesel engines such systems are not feasible, the present system is.

Likewise in prior art systems pressures are developed approximately proportional to the driving torque which must be raised to substantially higher pressures after the shifting of gears but there is no change of torque in the torque converter required to bring it to the point of highest torque conversion. Accordingly, a pump is required to develop a seldom used pressure at the time of needed maximum torque conversion.

The present invention seeks to overcome the disadvantages of the prior art namely poor correspondence of torque in the gearing with actual control conditions needed for accurate shifting control and thereby avoids large friction clutches or brakes, and supplemental devices, in the transmission ultimately needed to effect smooth shifting.

Briefly, the invention provides a system wherein a computer determines an electrical output signal in magnitude based on the drive torque, driven torque, and to the ratio of the driven and drive torques of the fluid drive. Such computer output signal of a particular magnitude is determined from electrical signals which are in magnitude proportional to converter or fluid coupling drive speed and driven speed, wherein the characterizing data of the particular fluid drive is programmed into the computer. The computer output is processed through suitable control devices involving further electrical signals of a magnitude proportional to vehicle speed whereby an ultimate control signal is provided for actuation of solenoid valves in a hydraulic system wherein a pressure proportional to the torque output of the fluid drive becomes available for shifting of gears, or solenoid controlled pressure operated valves.

An essential advantage of the invention as compared with the prior art systems which utilize motor torque for developing gear shifting pressures proportional to load is that in the present invention such actuating pressure is not proportional to the engine torque but rather to the output torque of the fluid drive and determined by a computer for instant output signal in proportion to such output torque.

A detailed description of the invention now follows in conjunction with the appended drawing in which.

Figure 1:
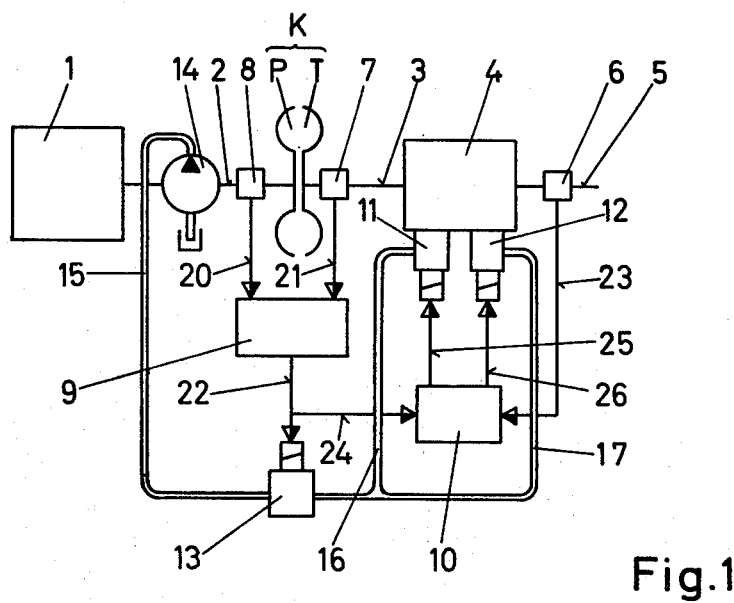
FIG. 1 is a diagrammatic illustration of a system utilizing a fluid coupling.

Referring to FIG. 1, the diagram depicts engine 1 connected by means of an output shaft 2 with the impeller P of the fluid coupling K having the turbine T connected by shaft 3 to a gear train or mechanism in gear box 4. A pressure controller valve 13 is connected to an oil pump 14 by a pressure conduit 15, the oil pump being mounted directly on engine output shaft 2. Valve 13 is a solenoid controlled pressure operated type of valve. Also mounted on the shaft 2 is a sensor 8 which develops an electrical signal proportional to the drive speed $n_1$ of the fluid coupling K. Such signal may be a voltage or current which is an analogue of the engine speed which drives the coupling K and can be effected either by an electrical generator or a speed responsive reostat or by any other well known device. The signal proportional to the drive speed $n_1$ is applied as an input via electrical connection 20 to a computer 9. In a similar manner a sensor 7 on shaft 3 sends an input electrical signal via electrical connection 21 to computer 9, a signal which is proportional to the driven speed $n_2$ to the coupling K.

A further sensor 6 on the gear output shaft 5 provides an electrical signal having a magnitude proportional to the vehicle travel speed V, such signal being conducted via connection 23 to an electrical control device 10, comprising a switch system.

The computer is programmed in accordance with the formula:

$$M_2 = M_p(n_2)/n_1 \cdot \mu(n_2)/n_1 \cdot n_1^2$$

where $M_2$ is the output torque of fluid drive $K$, $M_p$ is the input torque at the speed $n_1 = 1$ U/min (1 rpm) and $\mu$ is the conversion factor for the specific fluid drive. Torques can be in any convenient units.

As can be seen the electrical magnitudes of input to the fluid converter are dependent on the ratio of the output and input speeds ($n_2/n_1$) wherein a constant $\mu$ for any specific converter or fluid coupling is a factor, all as programmed into the computer 9. The computer output is an electrical signal of magnitude proportional to output torque $M_2$.

The electrical signal magnitude at the computer output actuates or controls valve 13 via electrical connection 22. The output also is transmitted to the electrical control device 10 via connection 24. The speed sensor 6 also transmits a voltage via line 23 to the control device 10.

Pressure from pump 14 is thus controlled at valve 13 proportional to the torque output $M_2$ of the coupling K and such pressure, either hydraulic or pneumatic, is conducted by conduits 16 and 17 to respective solenoid valves 11 and 12. The valves 11 and 12 are independently controlled by output signals from the control device 10 via respective electrical connections 25 and 26.

Accordingly, depending upon output signals from control device 10, the valves 11 and 12 are energized for effecting shifting of gears in the gear box 4 by application of brakes, clutches, and the like, in a conventional manner. Valves 11 and 12 are solenoid controlled pressure operated valves and control the pressure for power operation of gear shifting apparatus in the gear box, all in a conventional manner.

The embodiment shown in FIG. 2 utilizes a torque converter G, and reference characters in FIG. 2 correspond as to like components to those heretofore described in FIG. 1, except as noted below. Thus, in FIG. 2 there is no direct sensing of the speed $n_2$, the output speed of the converter, it being noted that there is no sensor 7 in FIG. 2 as there is in FIG. 1. However, the output speed of the converter is derived as a function of the vehicle speed sensed by the sensor 6 wherein the electrical output signal from that sensor is fed to the control device 10 and such control device has an output connection 28 to the computer 9. Such derivation of an output signal for $n_2$ occurs in the control device 10 and, accordingly, the output signal in connection 28 to the computer 9 is essentially the same signal which the computer 9 in FIG. 1 receives from the sensor 7 via connection 21.

Figure 2:
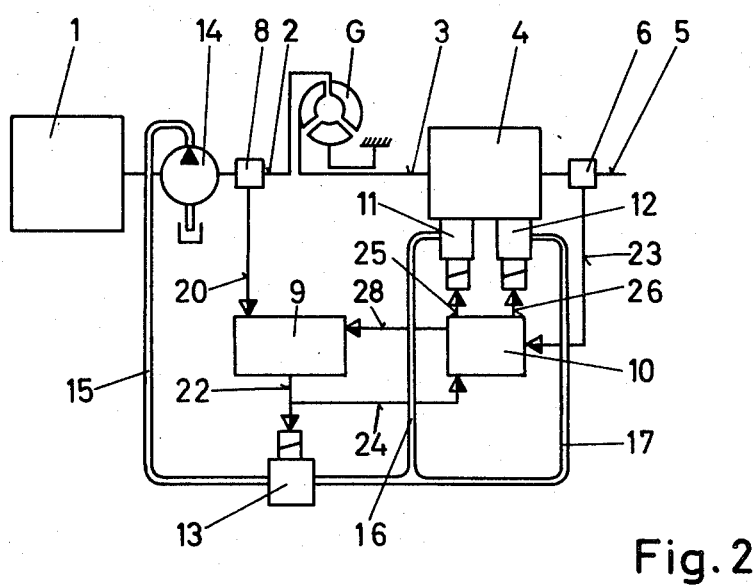
FIG. 2 is a diagrammatic illustration of a system using a torque converter.

Accordingly, operation of the modification of FIG. 2 operates as set forth for FIG. 1, except for $n_2$ being indirectly provided as an electrical signal to the computer input.

Figure 3:
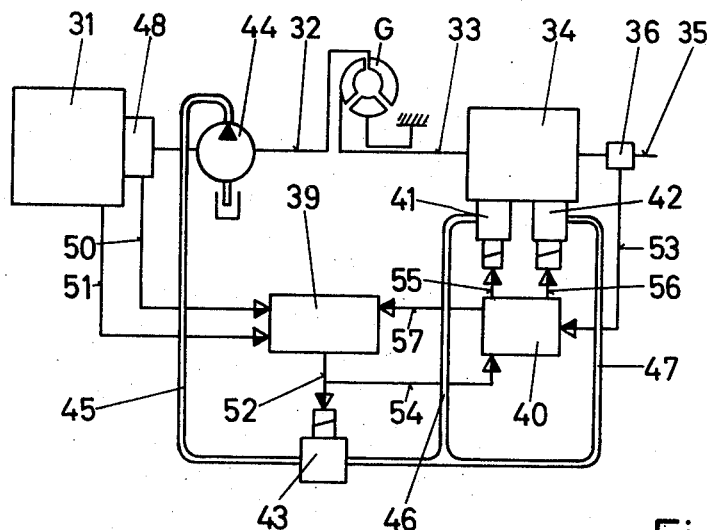
FIG. 3 is a diagrammatic illustration of a modified system using a torque converter.

In the form of the invention shown in FIG. 3, a torque converter G is again utilized and most components shown are similar to those shown in FIG. 2 with, however, certain exceptions. In FIG. 3 the engine 31 has a component 48 which sends a signal frequency proportional to engine rpm $n_1$ via line 50 to computer 39 while a signal proportional to engine torque $M_1$ goes to the computer via connection 51. The output speed $n_2$ of the converter G is determined as in the embodiment of FIG. 2. Also, on driven shaft 35 there is a sensor 36 which sends an electrical signal proportional to vehicle speed V via the line 53 to the electrical control device 40. The electrical control device 40 receiving such signal and being responsive to the gear shift setting in the gear box 34 generates an output signal which passes to computer 39 via connection 57, such output signal from control device 40 being proportional to the output speed $n_2$ of the converter output shaft 33. The output of computer 39 is connected via electrical connection 52 to control valve 43 and also to the control device 40. The control device 40 is thus conditioned to energize valves 41 and 42 via respective electrical connections 53 and 56 in the output of the control device to effect gear shifting in gear box 34 in accordance with signals received via connections 53 and 54.

Pressure for the valves comes from pump 44 mounted on the converter input shaft 32 and connected via a conduit 45 to control valve 43 and thence via lines 46 and 47 to the respective valves 41 and 42. The pressure in valve 43 is a function of the value of the torque output $M_2$ of converter G, similarly to valve 13, FIGS. 1 and 2.

In contrast to the forms of the invention in FIGS. 1 and 2 the modification of FIG. 3 utilizes a torque output $M_2$ determined from engine torque $M_1$ which is determinable in various ways as by throttle valve setting or intake manifold pressure or from some other variable control or characteristic of the engine. In the modification of FIG. 3 the computer 40 is programmed in accordance with the equation $M_2 = M_1 \cdot \mu (n_2)/n_1$, and such computer is less expensive than that shown in the previous modifications.

The form shown in FIG. 3 is intended for fuel injection engines now coming into vogue, no carburetor being used. The component 48 is an engine driven pulse transmitter having a signal frequency proportional to engine rpm.

The signal for motor torque $M_1$, via line 51 is a function of intake pressure effected in a known manner by an inductive measuring sensor.

Regarding the preceding descriptions, it will be understood that the basis concept of shift control is based on torques and vehicle speed. The hydraulic and electrical components may be selected to suit various applications, e.g., solenoid operated or pressure operated solenoid controlled valves may be used. Any suitable computer is usable made in accordance with well known principles for effecting an output signal based on programming for a signal proportional to torque output of the fluid drive. Voltage generators have been found suitable for rpm measurement of $n_1$, $n_2$ and V, i.e., the sensors 6, 7, 8. Alternatively, pulse transmitters are usable, where pulse frequency is proportional to rpm. In fact, pulsing produced by cylinder firing is usable, i.e., the firing of the spark plugs.

What is claimed is:

1. A system for changing gear ratios in a gear transmission comprising a fluid drive for driving said transmission from an engine; means for effecting electrical input signals proportional to input speeds and output speeds of said fluid drive; a computer programmed in accordance with characteristics of said fluid drive to derive output electrical signals proportional to output torque of said fluid drive in response to said input signals; and means for applying said output signals to a gear change mechanism of said transmission to effect selective shifting in conjunction with electrical signals proportional to the output speed of said transmission.

2. A system as set forth in claim 1, wherein said computer is programmed in accordance with the equation $$M_2 = M_p (n_2)/n_1 \cdot \mu (n_2)/n_1 \cdot n_1^2$$

where $M_2$ is the output torque of the fluid drive to be derived as said output signal; $M_p$ is the input torque to the fluid drive, $n_1$ is the input speed of the fluid drive, $n_2$ is the output speed of the fluid drive and $\mu$ is a constant for the specific fluid drive dependent upon the characteristics thereof.

3. A system as set forth in claim 1, wherein said computer is programmed in accordance with the equation $$M_2 = M_1 \cdot \mu (n_2)/n_1$$

where $M_2$ is the output torque of the fluid drive derived by the computer, $M_1$ is the torque of the engine, $\mu$ is a constant dependent upon characteristics of the fluid drive, $n_1$ is the input speed of the fluid drive and $n_2$ is the output speed of the fluid drive.

4. A system as set forth in claim 1, wherein said fluid drive is a fluid coupling.

5. A system as set forth in claim 1, wherein said last mentioned means comprise an output shaft of said transmission and means on said shaft responsive to speed thereof for transmitting a signal representative of the value of such speed, said last mentioned means being effective to provide an input signal to said computer proportional to the output speed of said fluid drive from the electrical signal proportional to the speed of said transmission shaft in conjunction with the specific speed setting of the gear shifting mechanism at that time.

6. A system as set forth in claim 1, including said fluid drive having an input shaft and an output shaft and speed responsive means on each of said shafts for effecting said electric signals proportional to the input and output speeds of said fluid drive.

7. A system as set forth in claim 3, wherein said fluid drive is a torque converter.

8. A system as set forth in claim 7, wherein the factor ($M_1$) for motor torque is derived as a function of engine intake pressure and the factor for input speed ($n_1$) of the fluid drive is provided by electrical impulse takeoff from a fuel injection system wherein frequency of pulses provided is proportional to input speed ($n_1$).

9. A method of changing gear ratios in a vehicle transmission having a fluid transmitter and gearing which comprises measuring input speed to the fluid transmitter; determining output torque of the fluid transmitter from the measured input speed and the operating characteristics of the fluid transmitter; ascertaining a value of speed of said vehicle, and shifting the gearing to a gear ratio selected on the basis of occurrence of a predetermined value of said torque in conjunction with predetermined vehicle speed.

10. In combination with a transmission having a fluid transmitter driving change speed gearing, drive ratio establishing means connected to the gearing, a source of pressurized operating fluid connected to said drive ratio establishing means, signal controlled means connected to the drive ratio establishing means, signal generating means connected to the fluid transmitter for measuring speed, computer means connected to the signal generating means and programmed to process speed information in accordance with operating data associated with said fluid transmitter for producing an output signal proportional to the output torque of the fluid transmitter, and pressure control means connected to the computer means for varying the pressure of the operating fluid in proportion to the output torque of the fluid transmitter.

11. The combination of claim 10 including means for supplying said output signal of the computer means to the signal controlled means for changing the drive ratio as a function of the output torque of the fluid transmitter.

12. The combination of claim 11 wherein the speed information processed by the computer means includes input and output speeds of the fluid transmitter measured by the signal generating means.

13. The combination of claim 10 wherein the speed information processed by the computer means includes input and output speeds of the fluid transmitter measured by the signal generating means.

14. The combination of claim 10 wherein the speed information processed by the computer means includes the input speed of the fluid transmitter measured by the signal generating means and an output speed value developed by the signal controlled means in response to output speed of the gearing measured by the signal generating means.

* * * * *